United States Patent [19]
Bender

[11] Patent Number: 5,257,759
[45] Date of Patent: Nov. 2, 1993

[54] METHOD AND APPARATUS FOR CONTROLLING A SOLAR WING OF A SATELLITE USING A SUN SENSOR

[75] Inventor: Douglas J. Bender, Redondo Beach, Calif.

[73] Assignee: Hughes Aircraft Company, Los Angeles, Calif.

[21] Appl. No.: 800,892

[22] Filed: Nov. 27, 1991

[51] Int. Cl.$^5$ .............................................. B64G 1/36
[52] U.S. Cl. ...................................... 244/168; 244/171
[58] Field of Search ................... 244/150 R, 164, 168, 244/171

[56] References Cited

U.S. PATENT DOCUMENTS

| | | | |
|---|---|---|---|
| 5,035,381 | 7/1991 | Matthews | 244/171 |
| 5,042,752 | 8/1991 | Sarquer et al. | 244/171 |
| 5,133,518 | 7/1992 | Plament | 244/168 |

OTHER PUBLICATIONS

Otterloo, P., "Attitude Control for the Netherlands Astronomical Satellite (ANS)," Philips Tech., Rev. 33, pp. 162–176, 1973.
"TD–1A: Europe'Largest and Most Advanced Satellite," Industries Atomiques & Spatiales, 1972, author unknown.
Lockheed's ATDRSS Phase A Study Report, #LMSC-F301910, author and date unknown.
Perkins, R. J., "Sensor For Driving A Solar Panel To Track The Sun," IBM Technical Disclosure Bulletin, vol. 23, No. 10, Mar. 1981.
Cantor, H. P., "Low Cost Fail-Safe Tracking Units For Concentrating Solar Collectors," publication and date unknown.
P. Overly, et al., "Accurex parabolic dish concentrator" publication and date unknown.
Sobczak, I. F., et al., "Development Status Of The PDC-1 Parabolic Dish Concentrator" publication and date unknown.

*Primary Examiner*—Galen Barefoot
*Attorney, Agent, or Firm*—William J. Streeter; Wanda K. Denson-Low

[57] ABSTRACT

This invention discloses a method for maintaining a desirable orientation of the solar wings of an orbiting satellite (10) relative to the sun. A dual array of sun sensors (26,28) is positioned on a body (12) of the satellite (10) in order to get a measurement of the position of the sun relative to the body (12) once per every orbit of the satellite (10). In addition, an estimate of the position of the solar wings (16,17) relative to the body (12) of the satellite (10) is attained. The sun-to-body angle is then subtracted from the body-to-wing angle to drive an error signal which is applied to a wing driver mechanism in order to maintain the solar wings (16,17) of the satellite (10) in a proper orientation relative to the sun.

23 Claims, 2 Drawing Sheets

METHOD AND APPARATUS FOR CONTROLLING A SOLAR WING OF A SATELLITE USING A SUN SENSOR

BACKGROUND OF THE INVENTION

1. Technical Field

This invention discloses generally a method of positioning a solar wing of a satellite relative to the sun, and more particularly, a method of positioning a solar wing of a satellite including compensating for the ephemeris motion of the sun by means of a sun sensor on the satellite's body.

2. Discussion

A geosynchronous earth orbit, as is known in the art, is the orbit about the earth in which a satellite or spacecraft will remain fixed above a specific location on the earth. This orbit is at a distance of approximately 22,400 miles above the earth. In this orbit, a beam, such as a communications beam, from the satellite can be maintained over a desirable area on the earth, such as a particular country, thus establishing an area which will receive the beam. To remain in a geosynchronous orbit it is necessary that the satellite be in an orbit substantially within the equatorial plane of the earth at the desirable distance, and that the satellite's attitude be oriented perpendicular to this plane. Any deviation or disturbance which causes the satellite to direct its antenna away from a boresight location on the earth tends to effect the coverage area of the beam, and thus, produces undesirable results. Many different forces are in effect on the satellite which tend to alter the satellite's antenna pointing direction.

As a first order method for countering the effects of the different forces acting on the satellite, it is known to stabilize the satellite's attitude by providing an angular bias momentum which resists changes in the satellite's orientation due to external forces transverse to the bias momentum axis. Satellites using this technique are generally referred to as "momentum bias" satellites. Angular momentum bias is usually provided by a number of momentum or reaction wheels which spin at least part of the satellite. The bias axis set by the spin of the momentum wheels is generally perpendicular to the direction of the orbit of the satellite. Although the bias momentum resists changes in the satellite's orientation in directions transverse to the bias momentum axis, it is still necessary to provide control for correcting variations in the satellite's orientation along the bias axis. Different methods of controlling the satellite's attitude, such as feedback loops, are known in the art.

For most bias momentum satellites, the satellite payload, i.e., the part of the satellite carrying at least the antenna, is oriented differently than the momentum wheel. It is therefore necessary to provide means for correcting the orientation of the payload with respect to the orientation of the momentum attitude. Typically, the satellite's payload is defined in three axes referred to as the yaw, roll and pitch axes. If the satellite is in a geosynchronous orbit, the yaw axis is generally directed from the satellite to the center of the earth, the pitch axis is generally directed normal to the plane of the orbit of the satellite and the roll axis is generally perpendicular to the yaw and pitch axes, in a direction of travel of the satellite as is well known in the art.

Satellites of the type discussed above generally include solar wings in order to generate the power necessary to operate the different electrical systems on the satellite. For maximum efficiency, it is well known that the solar panels on the solar wings need to be perpendicular to the direction of the incoming rays of light from the sun. However, at a geosynchronous altitude the apparent azimuthal position of the sun, i.e., the angle about the satellite pitch axis between the sun and the earth's center, as measured at the same time of day, changes seasonally up to about ±4.5°. If this change in the position of the sun relative to the solar wings of the satellite is not corrected for, a significant reduction in efficiency of power collection by the solar wings occurs over time due to the fact that the light rays will be hitting the solar wings at a substantial angle from normal.

The prior art solar wing steering mechanisms on satellites generally include only means to track the sun at a constant rate. Consequently, as discussed above, this has allowed for certain tracking errors due to the sun's ephemeris motion in that the normal tracking rate does not consider this motion. In these types of systems, it has been generally required that sensing and adjusting of the wing position relative to the sun be done from a ground location to correct for this motion. This process provides a costly interference with the satellite which need not occur.

What is needed then is a system for automatically controlling the desired position of the solar wings of a satellite by means of a sensor on the satellite, without any intervention from a ground station. It is accordingly an object of the present invention to provide such a system.

SUMMARY OF THE INVENTION

Disclosed is a method and apparatus for maintaining the solar wings of an orbiting satellite nominally sun-normal by incorporating sun sensors on the satellite's body. More particularly, a pitch acquisition slit sun sensor (so-called because this sensor is also used to acquire the spacecraft attitude about the pitch axis) gives a once-per-day measurement of the satellite's pitch angle with respect to the sun. In one preferred embodiment, there are two slit sun sensors configured along the satellite's pitch axis. These sensors have fields of view in the plane defined by the satellite's roll and pitch axes and are directed along the positive satellite roll axis. The combination of these sensors provides a body-to-sun angle measurement when the positive satellite roll axis goes past the sun's projection onto the earth's equatorial plane. This phenomena occurs once per day. In addition, the position of each solar wing with respect to the satellite's body is tracked by determining the position of a solar wing driver mechanism in order to give a body-to-wing angle measurement. These measurements are used to update estimates of body-to-sun and body-to-wing angles, which are propagated nearly continuously in time.

For each of the satellite's wings, the body-to-sun angle estimate is subtracted from the body-to-wing angle estimate, thus yielding an estimated offset position of each solar wing with respect to the sun. This estimated offset is compared to the desired offset to compute an offset error. A wing slewing rate proportional to the error is then commanded until the error angle is nulled. In this fashion, solar wing steering is accomplished in a closed-loop fashion by using the once per day sun sensor measurement to determine the proper solar wing position relative to the sun.

DETAILED DESCRIPTION OF THE PREFERRED EMBODIMENT

The following discussion of the preferred embodiments concerning tracking of the solar wings of a satellite is merely exemplary in nature and is in no way intended to limit the invention or its application or uses.

Figure 1:
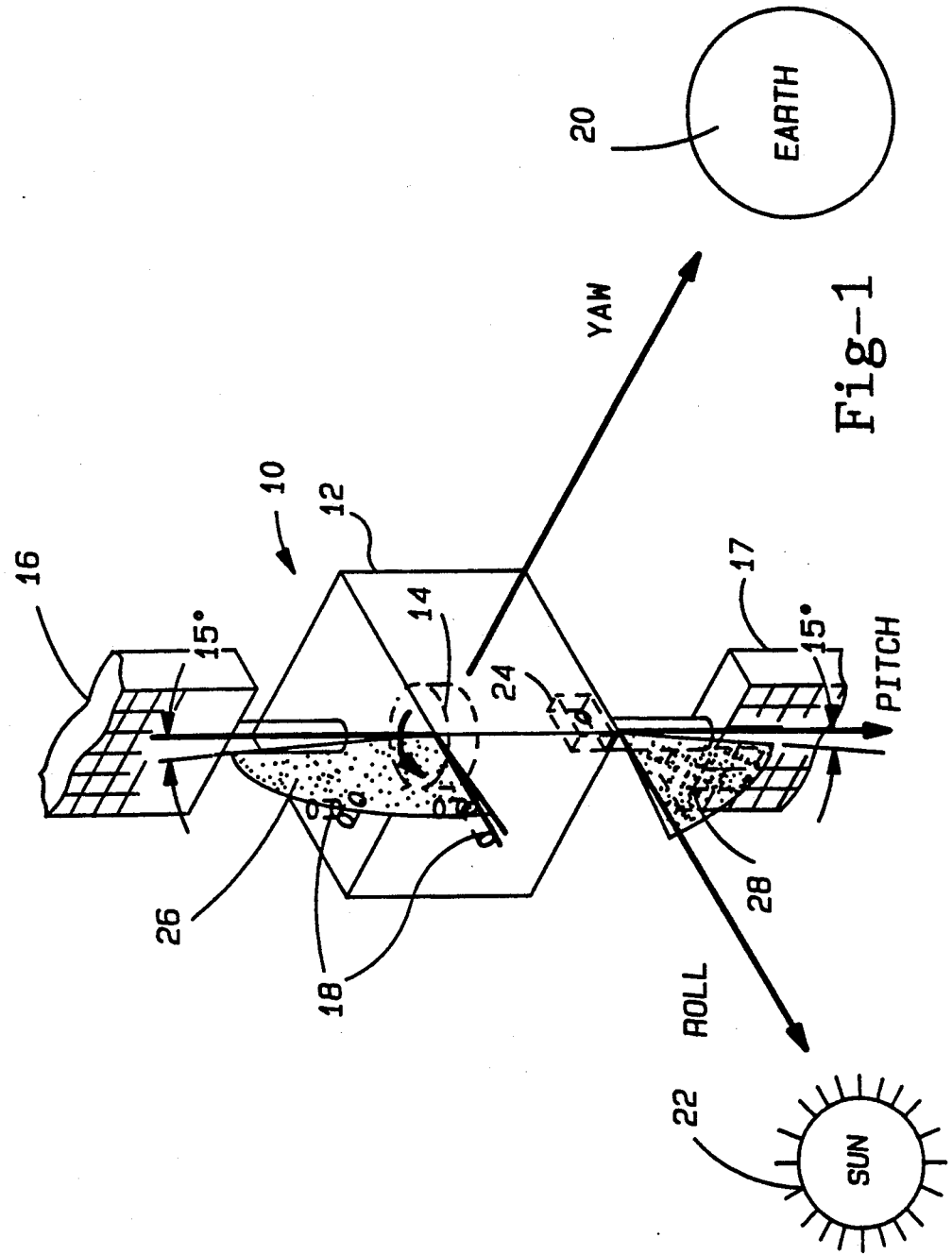
FIG. 1 is a diagram showing the positioning of an orbiting satellite relative to the earth and the sun.

Before going on to the specifics of the invention, it may be helpful to get an overview of the type of satellite which may incorporate the invention. To get this understanding, first turn to FIG. 1. In FIG. 1, the relationship of a momentum bias satellite 10 orbiting the earth 20 and relative to the sun 22 is shown. Satellite 10 includes a satellite central body 12, here depicted as a cube. By representing body 12 of satellite 10 as a cube it is easier to visualize the coordinates of the satellite's axes of yaw, roll and pitch. As discussed above, the yaw axis is the axis directed from the attitude of the satellite body 12 to the center of the earth 20, the pitch axis is directed normal to the orbit of satellite 10 and normal to the yaw axis, and the roll axis is perpendicular to the yaw and pitch axes, in a direction along travel of satellite 10. Each of these axes are shown in a directional manner in FIG. 1.

Satellite 10 includes a momentum wheel 14 which spins in a particular direction, here clockwise as shown, in order to stabilize satellite 10 in its orbit. The axis of rotation of momentum wheel 14 is generally parallel to the pitch axis of the satellite's body 12. The momentum wheel 14 is typically oriented separate from the reference of the satellite body 12. In one example, the orientation of the momentum wheel 14 will be on a 2-axis gimbal. The momentum wheel 14, in this example, is an actuator which adjusts and maintains the satellite's attitude. The pitch axis and momentum axis would be oriented substantially perpendicular to the equatorial plane of the earth 20 if satellite 10 were in a geosynchronous orbit.

Satellite 10 further includes an array of integrating gyros 18 and a thermopile earth sensor 24. Integrating gyros are generally used to orient the satellite 10 in a desirable configuration when the satellite 10 reaches its geosynchronous altitude as is known in the art. In normal operation of satellite 10, integrating gyros 18 would not be used. Earth sensor 24, sometimes referred to as a horizon sensor, senses the horizon of the earth in order to establish an inertial reference frame for the proper orientation of the satellite 10. An earth sensor will typically measure the satellite's orientation in the roll and pitch directions. Other types of sensors, including but not limited to star sensors, sun sensors, gyros and ground beacon sensors, could also provide the necessary sensing of the satellite's attitude. Projecting from satellite body 12 are dual solar wings 16 and 17 shown here in a cut-away format. Solar wings 16 and 17 are directed perpendicular to the rays of the sun in order to provide the necessary power to the electrical systems on satellite 10.

In a geosynchronous orbit, two basic effects determine how the sun is referenced to the solar wings 16 and 17 of satellite 10. The first effect is caused by the eccentricity of the orbit of the earth about the sun. As a result of orbit eccentricity from the orbit reference frame, the sun appears to move to the right, then reverse itself and move to the left, and then back to the right again. With respect to a fixed geosynchronous orbit about the earth, the sun appears to oscillate in the horizontal orbit plane with an amplitude of approximately 1.8° over a period of one year. As the earth travels closer to the sun, its potential energy is being traded as an increase in kinetic energy. Relative to a geosynchronous satellite, this increase in velocity is a movement of the sun to the left. A decrease in velocity as the earth travels away from the sun, causes the sun to move to the right. In this respect, the suns movement appears to reverse itself twice per year due to the fact that the earth approaches and recedes from the sun twice during one orbit about the sun. If this motion is uncompensated for, the periodic angular movement of the sun results in errors in solar wing pointing with respect to the sun and consequently loss of solar power. The earth's eccentric orbit results in a wing pointing error of approximately $1.8 \sin(L+13.4)°$, where L is the sun's longitude angle.

The second effect is caused by the inclination of the earth's axis relative to the earth-sun orbit plane. Because of the tilt of the earth's rotational axis, in a single year the sun travels above the earth's spin plane and then travels below the earth's spin plane. The maximum position of the sun above the orbit plane is referred to as the summer solstice while the maximum position of the sun below the orbit plane is referred to as the winter solstice. In addition, the position of the sun as it crosses the earth's orbit plane from below is called vernal equinox, and the position of the sun as it crosses the earth's orbit plane from above is referred to as autumnal equinox.

Figure 2:
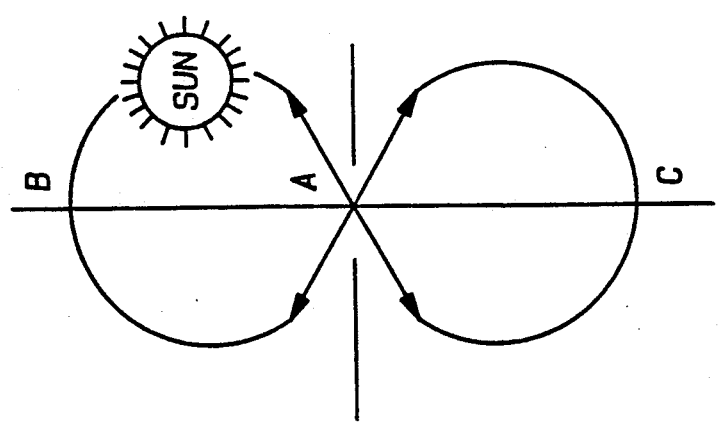
FIG. 2 is a diagram of the sun's position at different times of the year relative to the satellite.

As a combination of these two effects, the sun appears to move in a figure eight pattern relative to the satellite's position as depicted in FIG. 2. Point A on FIG. 2 represents the vernal and autumnal equinoxes, point B represents the winter solstice and point C represents the summer solstice. In this manner, the movement of the sun starts at point A and moves below the earth's spin plane to point C. As the sun is dropping to point C, it appears to move to the left, then to the right. In the first half of the year, the sun returns to point A, first moving to the right and then to the left. During the second half of the year, the sun appears to move from point B and again return to point A. If this motion is uncompensated for, the solar wing pointing error is zero if the sun remains at points A, B or C. However, when the sun moves off the vertical axis connecting these points, it appears as an east-west movement with respect to the solar wings. This oscillating effect reduces the horizontal orbit plane at an amplitude of about 2.5° in a period of six months, $2.5° \sin(2L)$. This periodic angular rotation of the earth through inclination results in a solar wing pointing error similar to that due to the eccentric orbit. If uncompensated for, the solar wings will not follow the horizontal angular movement of the sun. In other orbits, other orbital effects may determine the sun's apparent motion.

Returning to FIG. 1, in order to determine the proper orientation of each of solar wings 16 and 17 to be facing normal to the sun 22 such that the rays of sun 22 hit the solar wings 16 and 17 substantially perpendicularly, it is necessary to first determine the angle between the satellite body 12 and the sun 22. To accomplish this, in a preferred embodiment, two pitch acquisition sun sensors are incorporated. More particularly, the sun sensors are sensitive about the satellite's pitch axis, as shown by the shaded regions 26 and 28, and give a once-per-day measurement of the satellite's pitch angle with respect to the sun. These pitch acquisition sensors are also used to determine the satellite's attitude relative to its pitch axis. The sensors have fields of view, as depicted by the shaded regions 26 and 28, in the plane defined by the satellite's roll and pitch axes and look along the positive satellite's roll axis. In an orbit configuration, one of these sensors has its field of view in the northern hemisphere of the earth and the other sensor has its field of view in the southern hemisphere of the earth. In the embodiment shown in FIG. 1, the sensors have their fields of view offset from the pitch axis by 15°. This offset is desirable in order to enable the satellite 10 to effectively locate the sun when the satellite is first put into orbit by maintaining hemisphere discrimination. In other words, the sun may be positioned relative to the satellite such that if the fields of view of the sensors were not offset from the pitch axis, the sensors would not be able to tell in which hemisphere the sun was located. In an alternate embodiment, the body-to-sun angle could be measured continuously from a wing mounted sun sensor. In addition, this angle could also be measured for several hours per day by using body mounted sun sensors with wide angle fields of view.

It is further necessary to determine the angle between the body 12 of satellite 10 and each of the solar wings 16 and 17. In one embodiment, the position of each wing 16 and 17 with respect to the satellite's body 12 is tracked by directly counting steps taken by a solar wing drive stepper servo mechanism (see FIG. 3). At the outset, the body-to-wing angle estimate is initialized from a measurement by a ground command station. In an alternate embodiment, it is possible to determine the body-to-wing angle by use of a potentiometer or resolver, known to those skilled in the art. This requirement would be essential if the solar wing driver was a continuous drive mechanism instead of a stepper servo mechanism.

As the satellite is orbiting about the earth, the satellite's body-to-wing angle is being propagated at the orbit rate according to the following equation:

$$\hat{\Theta}^{bw}_{k+1} = \hat{\Theta}^{bw}_k + \omega_0 T_s,$$

where $\hat{\Theta}^{bw}$ is the body-to-wing angle estimate (k+1 represents the next time interval with respect to the k'th time interval), $\omega_0$ is the satellite rotation rate with respect to the sun, and $T_s$ is the period of propagation of the orbit.

As the sun sensor measurements from the sun sensors are made available once per orbit, the body-to-wing angle estimate is updated by the following equation:

$$\hat{\Theta}^{bw} \leftarrow \hat{\Theta}^{bw} + K_\Theta [\beta^{ss} - \hat{\Theta}^{bw}]$$

where $\beta^{ss}$ is the sun sensor position with respect to the satellite's body 12 and $K_\Theta$ is a correction gain.

In one particular embodiment, $K_\Theta$ has a default gain of one and therefore when a new sensor measurement is made available, $\hat{\Theta}^{bw}$ is reset to the new measured value $\beta^{ss}$. If the sun sensor is noisy, $K_{73}$ can be adjusted to provide filtering.

Figure 3:
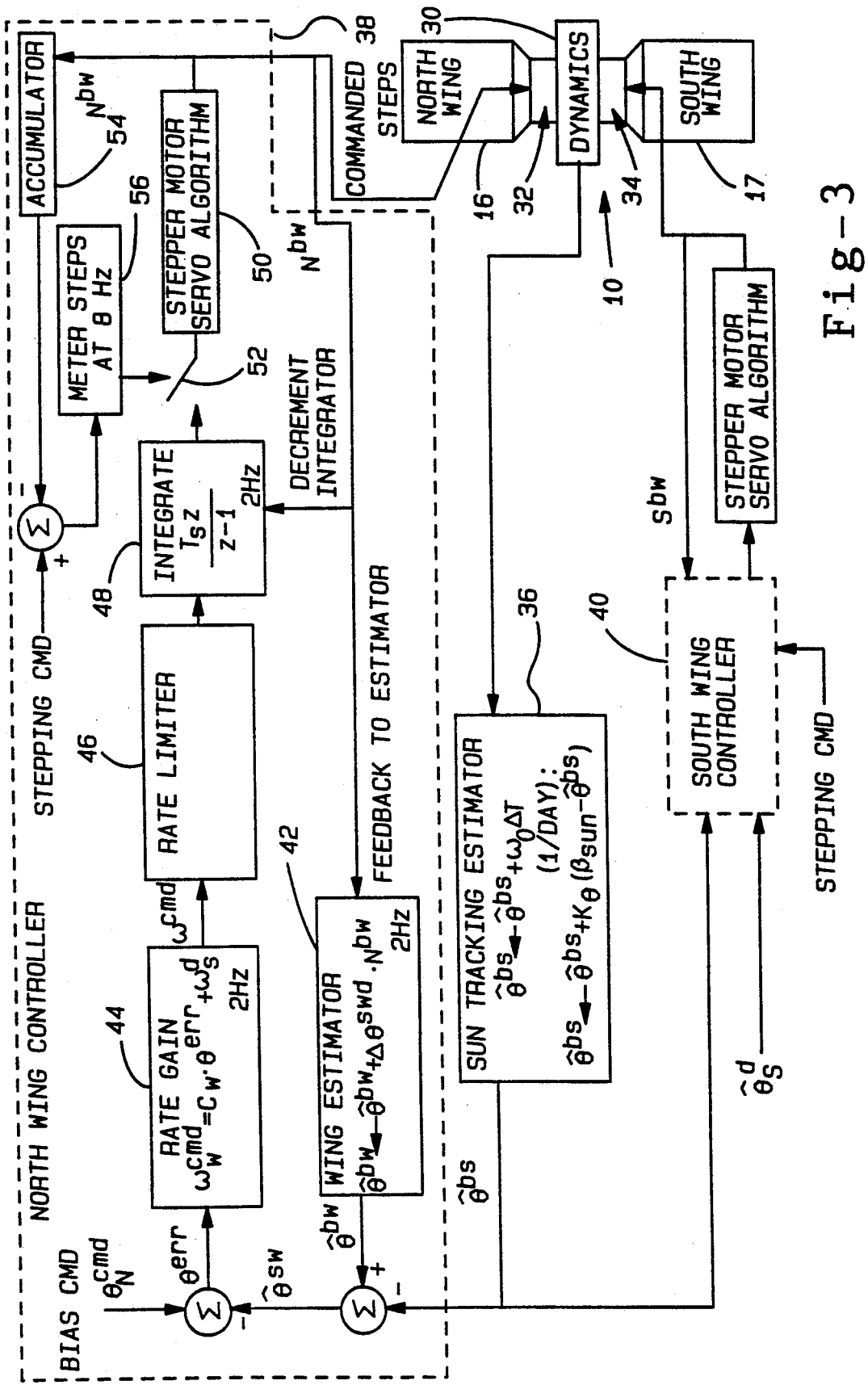
FIG. 3 is a block diagram schematic showing the solar wing adjustment technique according to one preferred embodiment of the present invention.

Now turning to FIG. 3, satellite 10 is shown in a somewhat different depiction than that of FIG. 1. In FIG. 3, the different mechanisms are shown in order to calculate the proper wing orientation. Satellite dynamics 30 represents the body 12 of satellite 10. North solar wing 16 and south solar wing 17 are shown here being controlled by a north solar wing drive 32 and a south solar wing drive 34, respectively. As discussed above, the sun sensors detect the position of the sun relative to the satellite's attitude once per orbit. This sun-to-body measurement is output to a sun tracking estimator 36 which determines the sun-to-body angle estimate $\hat{\Theta}^{bs}$. The body-to-sun angle estimate $\hat{\Theta}^{bs}$ is updated by the algorithm as discussed above. Likewise, the north and south body-to-wing measurement is taken from each of the north and south solar wing drivers 32 and 34 and applied to the appropriate north and south wing controller systems. Here north wing controller 38 is shown with the major system components included. South wing controller 40 is just shown in a block form. It will be understood that it includes the identical components to that of the north wing controller 38.

North wing controller 38 includes a wing estimator 42 which receives the signal $N^{bw}$ as the change in the position of the body 12 of satellite 10 to the north wing 16. A body-to-wing angle estimate is derived in the wing estimator 42 to be a value of $\hat{\Theta}^{bw}$ and is updated by $N^{bw}$ each time new steps are commanded to the solar wing drive mechanism, as discussed above. The body-to-sun angle estimate $\hat{\Theta}^{bs}$ is subtracted from the body-to-wing angle estimate $\hat{\Theta}^{bw}$, yielding the estimated position of the north solar wing 16 with respect to the sun 22, depicted as $\hat{\Theta}^{sw}$. This estimated offset is compared to the desired offset $\Theta_N$ from the bias command to compute an offset error $\Theta^{err}$. The offset error $\Theta^{err}$ is applied to a rate gain algorithm 44 which derives a wing command $\omega^{cmd}$ to move the wing. The algorithm in this example is $\omega^{cmd} = c_W \Theta^{err} + \omega_s^d$, where $\omega_s^d$ is the rate of the sun and $C_W$ is a proportionality constant to proportionally increase the amplitude of the error signal. In this manner, the command signal $\omega^{cmd}$ is generated as the sun rate plus the appropriate error signal as the body-to-sun angle estimate minus the body-to-wing angle estimate.

Typically, this wing command signal $\omega^{cmd}$ will be beyond the limits of the speed of the wing drive mechanism, and therefore, the wing command $\omega^{cmd}$ is applied to a rate limiter device 46 which limits the rate in which the wing is moved. With the gains above, typically any angle offset above 0.1° causes the maximum rate to be commanded. Thus, even though the control rate is computed as a linear gain times the error, the system nulls any appreciable error angle at the maximum commanded stepping rate. Even though it takes an entire orbit for the wing-to-sun estimate to be updated, the wing angular error is nulled almost immediately after the updated information is received.

From the rate limiter device 46, the wing rate command $\omega^{cmd}$ is applied to an integrator device 48 which converts the linear wing command to an angular command. As is shown, the integration device 48 is updated by the wing position change signal $N^{bw}$. The angular wing command is then applied to a stepper motor servo algorithm 50 in which the stepper motor servo algorithm 50 receives the wing rate angle command and converts it to a stepping motion to drive the north wing servo driver 32. In addition, the servo command is applied to an accumulator 54 in order to keep track of the position of the wing by counting the steps the servo commands the servo driver.

As is apparent, a switch 52 is positioned between the integration device 48 and the stepper motor servo algorithm 50. In normal operation the switch 52 is closed such that a stepping command as commanded through a metering device 56 does not come into play. However, when the switch 52 is opened, a ground station can command the wings to be slewed to a desired position. This concept will be discussed in more detail below. It will be appreciated that the south wing controller 40 operates in the same manner, and thus, need not be explained in detail.

The implementation described above for the compensation algorithm was a discrete time implementation using an estimator-controller format and implicitly using a digital computer. In this manner, there was essentially a first-order discrete-time estimator (or observer) for $\hat{\Theta}^{bs}$, and merely an accumulator for $\hat{\Theta}^{bw}$. However, there are several alternate implemental variations. First, this compensation could also be accomplished with analog electronics. In this manner, the body-to-sun angle would be propagated in continuous time as:

$$\dot{\hat{\Theta}}^{bw} = \omega_0.$$

In another alternate implementation, the order of the compensation could be increased. In particular, the body-to-wing and body-to-sun observers could each include two states for angle and rate estimates. The control would then be computed as a weighted sum of angles and rate errors. This is equivalent to including a phase lead term in the compensating device. Finally, the compensation does not necessarily need to be implemented in observer-controller format. It is possible that this compensation could be implemented in a more general transfer function format.

In addition to the sun tracking mode that the solar wing control algorithm has as discussed above, the solar wing control algorithm includes two other modes. First, the solar wings can be steered directly by ground command. In this mode a number of steps for the wing drive mechanism to travel is commanded. The stepper motor servo then meters out the steps to the motor driver until the wing has moved to the desired position. This direct ground command mode can be used, for example, to steer the wings to ±180° when setting the satellite up for a long-term storage after a failure has occurred. A second mode is an east pointing mode. When the initial acquisitions are performed, the solar wings will be steered so that they point to the east face of the satellite. This is to ensure that after sun acquisition by the east pointing yaw and pitch sun sensors, the solar wings will point towards the sun. The solar wings are steered using a wing-to-body potentiometer as a reference until the east pointing orientation is achieved.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. A system for maintaining a desirable orientation of at least one solar wing of an orbiting satellite relative to the sun, said satellite including a satellite body having at least one slit sun sensor to provide a measured satellite body to sun angle once per orbit of the satellite, said system comprising:
    driver means for driving the at least one solar wing;
    sun tracking estimator means for estimating the position of the satellite body relative to the sun to derive a body-to-sun angle;
    wing estimator means for estimating the position of the at least one solar wing relative to the satellite body to derive a body-to-wing angle;
    subtraction means for subtracting the estimate of the position of the satellite to the sun from the estimate of the position of the satellite body to the at least one solar wing to develop an error signal; and
    control means for providing a control signal relative to the error signal to command the driver means to move the at least one wing to track the sun; and
    wherein the derived body-to-sun angle is updated with the measured body to sun angle once per orbit of the satellite.

2. The system according to claim 1 wherein the at least one sun sensor is two sensors, said two sensors being oriented along a satellite pitch axis substantially perpendicular to the orbit plane of the satellite, said two sensors having a field of view in a plane defined by the satellite pitch axis and a satellite roll axis.

3. The system according to claim 2 wherein one of the two sensors has its field of view in the northern hemisphere of the earth and the other of the two sensors has its field of view in the southern hemisphere of the earth.

4. The system according to claim 1 wherein the driver means is a stepper motor such that the at least one solar wing is moved in a stepping motion to track the sun.

5. The system according to claim 1 wherein the driver means is a continuous driver for continually driving the at least one solar wing to track the sun.

6. The system according to claim 1 wherein the control means includes a rate gain means for applying a proportionality constant to the error signal and adding it to a predetermined rate of the sun to develop the control signal.

7. The system according to claim 6 wherein the control means further includes a rate limiter means for limiting the control signal from the rate gain means to a value within the parameters of the driver means.

8. The system according to claim 7 wherein the control means further includes an integration means for converting the control signal from the rate limiter means to an angular command to be applied to the driver means.

9. The system according to claim 1 further comprising a ground command means for directing a ground command signal to disengage the control means such that the ground command means provides the command to the driver means to drive the at least one solar wing.

10. The method according to claim 1 wherein the step of driving the solar wing includes driving the wing in a stepped fashion.

11. The method according to claim 1 wherein the step of driving the solar wing includes driving the solar wing in a continuous fashion.

12. The method according to claim 1 wherein the step of driving the wing includes commanding the wing from a ground location.

13. A method of maintaining a desirable orientation of a solar wing of an orbiting satellite relative to the sun, and method comprising the steps of:
   estimating the position of a body of the satellite relative to the sun;
   estimating the position of the solar wing relative to the body;
   subtracting the estimated position of the body relative to the sun from the estimated position of the body relative to the wing to develop an error signal;
   driving the wing to track the sun in response to the error signal;
   detecting the position of the body relative to the sun once per orbit of the satellite by means of a sun sensor mounted on the body; and
   updating the estimated position of the body relative to the sun with the detected position of the body relative of the sun.

14. The method according to claim 13 wherein the step of estimating the position of the body relative to the sun includes the step of positioning a sensor on the body to detect the sun's position once per orbit of the satellite.

15. The method according to claim 14 wherein the step of positioning a sensor on the body of the satellite includes the steps of positioning two sensors on the body of the satellite, one sensor having a field of view in th e northern hemisphere of the earth and the other sensor having a field of view in the southern hemisphere of the earth, both of the fields of view being in a satellite pitch axis and roll axis.

16. The method according to claim 15 wherein the step of estimating the wing position relative to the body of the satellite includes the step of monitoring the position of the wing as it is tracking the sun.

17. The method according to claim 13 wherein the step of driving the wing includes the steps of applying the error signal to a rate gain system in order to develop a commanded wing rate from a predetermined rate of the sun plus the error signal times a proportionally constant.

18. The method according to claim 17 wherein the step of driving the solar wing further includes the steps of applying the commanded wing rate to a rate limiter in order to limit the commanded rate to an applicable value capable of being handled by the mechanism driving the wing.

19. The method according to claim 18 wherein the step of driving the solar wing further includes applying the commanded wing rate from the rate limiter to an integrator in order to convert a wing rate command to a wing rate angle command.

20. A system for maintaining a desirable orientation of at least one solar wing of an orbiting satellite relative to the sun, said satellite including a satellite body, said system comprising:
   driver means for driving the at least one solar wing;
   at least one sun sensor positioned on the body of the satellite to determine the position of the sun relative to the body of the satellite once per orbit of the satellite; and
   control means for providing a control signal relative to the position of the body of the satellite to the sun in order to command the driver means to move the at least one solar wing to track the sun.

21. The system according to claim 20 further comprising means for determining the position of the solar wing relative to the satellite body.

22. The system according to claim 21 further comprising subtraction means for subtracting the body-to-sun angle from the body-to-wing angle to derive an error signal, said error signal being applied to the driver means to track the sun.

23. The system according to claim 20 wherein the at least one sensor is two sensors aligned along a pitch axis of the satellite, one of the two sensors having a field of view in the northern hemisphere of the earth and the other sensor having a field of view in the southern hemisphere of the earth.

* * * * *